US007657271B2

(12) United States Patent
Kim (10) Patent No.: US 7,657,271 B2
(45) Date of Patent: Feb. 2, 2010

(54) SYSTEM AND METHOD FOR SYNCHRONIZING OF INFORMATION WITHOUT DATA DUPLICATION (75) Inventor: Yong-Sik Kim, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 1052 days.

(21) Appl. No.: 10/899,971

(22) Filed: Jul. 26, 2004

(65) Prior Publication Data
US 2005/0117606 A1 Jun. 2, 2005

(30) Foreign Application Priority Data
Nov. 27, 2003 (KR) ............ 10-2003-0085263

(51) Int. Cl.
H04W 4/00 (2006.01)
(52) U.S. Cl. ............... 455/466; 455/412.1; 455/414.1; 455/502; 455/558; 455/41.2; 709/206; 707/10; 707/8
(58) Field of Classification Search ........... 455/466, 455/412.1, 556.1, 415, 502, 458, 558, 414.1; 707/201; 709/206; 379/88.11, 93.17
See application file for complete search history.

(56) References Cited

U.S. PATENT DOCUMENTS

| 5,465,401 | A | * | 11/1995 | Thompson | 455/558 |
| 5,848,415 | A | * | 12/1998 | Guck | 707/10 |
| 5,920,826 | A | * | 7/1999 | Metso et al. | 455/557 |
| 6,084,951 | A | * | 7/2000 | Smith et al. | 379/93.17 |
| 6,085,099 | A | * | 7/2000 | Ritter et al. | 455/466 |
| 6,151,507 | A | * | 11/2000 | Laiho et al. | 455/466 |
| 6,175,741 | B1 | * | 1/2001 | Alperovich | 455/458 |
| 6,272,545 | B1 | * | 8/2001 | Flanagin et al. | 709/228 |
| 6,411,822 | B1 | * | 6/2002 | Kraft | 455/558 |
| 6,816,725 | B1 | * | 11/2004 | Lemke et al. | 455/414.1 |
| 6,839,564 | B2 | * | 1/2005 | Sutinen et al. | 455/502 |
| 6,909,910 | B2 | * | 6/2005 | Pappalardo et al. | 455/558 |
| 6,968,209 | B1 | * | 11/2005 | Ahlgren et al. | 455/558 |
| 7,024,214 | B2 | * | 4/2006 | Loveland | 455/502 |
| 7,050,790 | B2 | * | 5/2006 | Yamaga | 455/412.1 |
| 7,058,417 | B2 | * | 6/2006 | Jeong | 455/466 |
| 7,130,649 | B2 | * | 10/2006 | Kwon et al. | 455/466 |
| 7,236,774 | B2 | * | 6/2007 | Lee | 455/417 |
| 7,280,647 | B2 | * | 10/2007 | Henderson | 379/142.01 |

(Continued)

FOREIGN PATENT DOCUMENTS

KR 10-0384443 B1 5/2003

(Continued)

OTHER PUBLICATIONS

KR 10-0384443 B1: KIM et al.*

Primary Examiner—Sharad Rampuria
(74) Attorney, Agent, or Firm—Lee, Hong, Degerman, Kang & Waimey (57) ABSTRACT A system for synchronizing information comprises a plurality of mobile communication devices storing individually incomplete user information, and at least one mobile service interface adapted to receive and transmit the stored user information for processing. The information synchronization system also comprises at least one processor adapted to arrange the transmitted user information to allow each mobile communication device to complete its user information without data duplication. The processor transmits the arranged user information to each mobile communication device via the mobile service interface for storage therein.

4 Claims, 6 Drawing Sheets

U.S. PATENT DOCUMENTS

| | | | |
|---|---|---|---|
| 7,317,907 B2 * | 1/2008 | Linkert et al. | 455/412.1 |
| 7,317,928 B2 * | 1/2008 | Stewart et al. | 455/466 |
| 7,333,804 B2 * | 2/2008 | Kim | 455/414.4 |
| 7,369,866 B2 * | 5/2008 | Choi | 455/466 |
| 2002/0102999 A1 * | 8/2002 | Maggenti et al. | 455/518 |
| 2003/0083046 A1 * | 5/2003 | Mathis | 455/412 |
| 2003/0126136 A1 * | 7/2003 | Omoigui | 707/10 |
| 2004/0025072 A1 * | 2/2004 | Mau | 713/400 |
| 2004/0258215 A1 * | 12/2004 | DeVito et al. | 379/88.11 |
| 2005/0148356 A1 * | 7/2005 | Ferguson et al. | 455/502 |
| 2005/0277407 A1 * | 12/2005 | Ahn et al. | 455/414.1 |
| 2007/0180038 A1 * | 8/2007 | Lee et al. | 709/206 |

FOREIGN PATENT DOCUMENTS

| | | |
|---|---|---|
| WO | WO 00/49821 | 8/2000 |
| WO | WO 03/039018 | 5/2003 |

* cited by examiner

SYSTEM AND METHOD FOR SYNCHRONIZING OF INFORMATION WITHOUT DATA DUPLICATION

CROSS-REFERENCE TO RELATED APPLICATIONS

Pursuant to 35 U.S.C. § 119(a), this application claims the benefit of earlier filing date and right of priority to Korean Patent Application No. 10-2003-0085263, filed on Nov. 27, 2003, the contents of which is hereby incorporated by reference in its entirety.

BACKGROUND OF THE INVENTION

1. Field of the Invention

The present invention relates generally to information synchronization and more particularly to a system and method for synchronizing of information without duplication of data.

2. Description of the Related Art

Mobile messaging has evolved from simple transmission of text to multimedia transmission by taking a development path from SMS (Short Message Service) to LMS (Long Message Service). It may be desirable for a group of mobile users to synchronize their telephone number or e-mail address data. While telephone numbers and e-mail addresses can always be manually exchanged, inputting the same into mobile terminals whether manually or using existing software applications is always on a one-to-one basis, time consuming and fraught with errors. Automatic information synchronization between a plurality of mobile devices would alleviate such problems and enhance communication between mobile users.

SUMMARY OF THE INVENTION

In accordance with one aspect of the present invention, a system for synchronizing information comprises a plurality of mobile communication devices storing individually incomplete user information, at least one mobile service interface adapted to receive and transmit the stored user information for processing, and at least one processor adapted to arrange the transmitted user information to allow each mobile communication device to complete its user information without data duplication. The processor transmits the arranged user information to each mobile communication device via the mobile service interface for storing therein.

Each mobile communication device may be a mobile terminal. Each mobile communication device and the processor are capable of long message service (LMS) messaging with the mobile service interface. The mobile service interface may be a long message service center (LMSC). The processor may be a web server.

In accordance with another aspect of the present invention, a method for synchronizing information comprises the steps of providing a plurality of mobile communication devices storing individually incomplete user information, providing at least one mobile service interface adapted to receive and transmit the stored user information for processing, processing the transmitted user information to allow each mobile communication device to complete its user information without data duplication, and transmitting the arranged user information to each of mobile communication device by way of the mobile service interface for storing therein.

These and other aspects of the present invention will become apparent from a review of the accompanying drawings and the following detailed description of the present invention.

BRIEF DESCRIPTION OF THE DRAWINGS

The present invention is generally shown by way of reference to the accompanying drawings as follows.

DETAILED DESCRIPTION OF THE PREFERRED EMBODIMENTS

Some embodiments of the present invention will be described in detail with reference to the related drawings of FIGS. 1-6. Additional embodiments, features and/or advantages of the invention will become apparent from the ensuing description or may be learned by practicing the invention.

In the figures, the drawings are not to scale with like numerals referring to like features throughout both the drawings and the description.

The following description includes the best mode presently contemplated for carrying out the invention. This description is not to be taken in a limiting sense, but is made merely for the purpose of describing the general principles of the invention.

Figure 1:
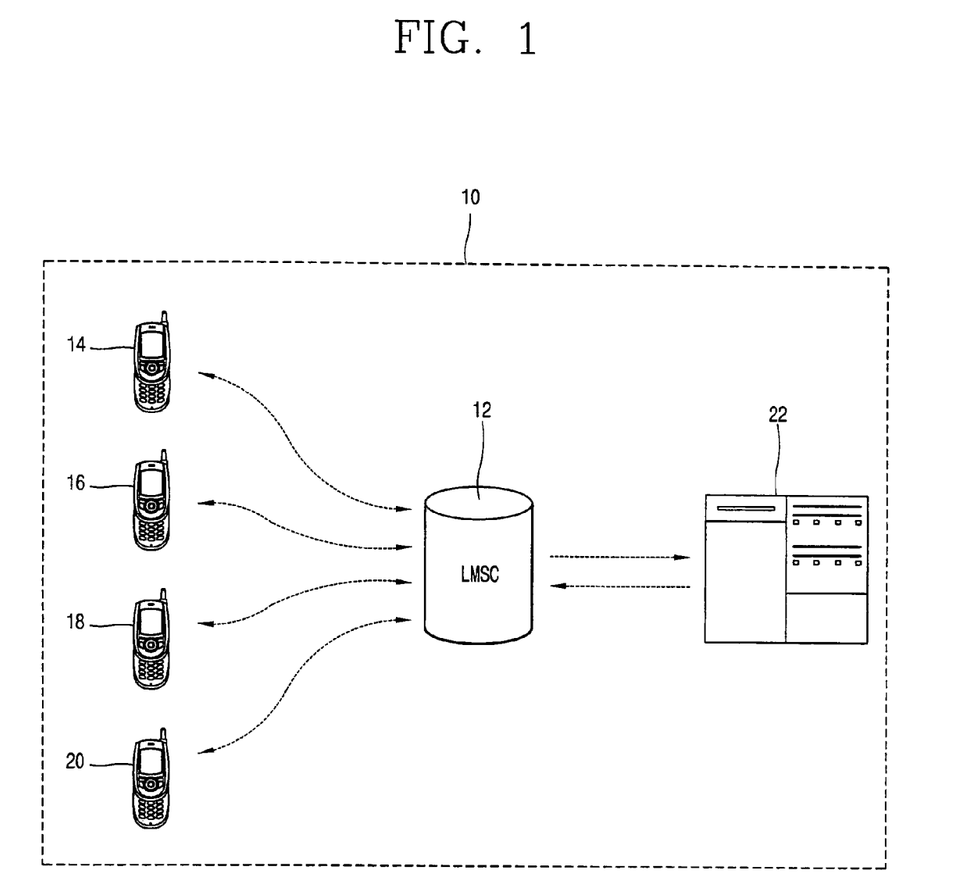
FIG. 1 schematically illustrates a system for synchronizing information on a plurality of mobile terminals without duplication of data in accordance with the present invention.

FIG. 1 schematically illustrates a system for synchronizing information on a plurality of mobile terminals without duplication of data, generally referred to by a reference numeral 10, in accordance with a preferred embodiment of the present invention. Information synchronization system 10 generally comprises a long message service center (LMSC) 12 operatively coupled between mobile terminals 14-20 and a web server 22. Web server 22 is adapted to receive/transmit long message service (LMS) messages from/to LMSC 12, respectively, via a communication network such as the Internet. Other communication networks may be utilized, provided such other communication networks do not depart from the intended purpose of the present invention.

Each mobile terminal (14-20) is preferably capable of long message service (LMS) messaging. Specifically, each mobile terminal can transmit/receive multimedia information, such as e-mail, audio, video, text and the like, to/from LMSC 12 via a suitable communication network. For example, mobile terminals 14-20 may use a wireless communication network to communicate with LMSC 12.

Figure 3:
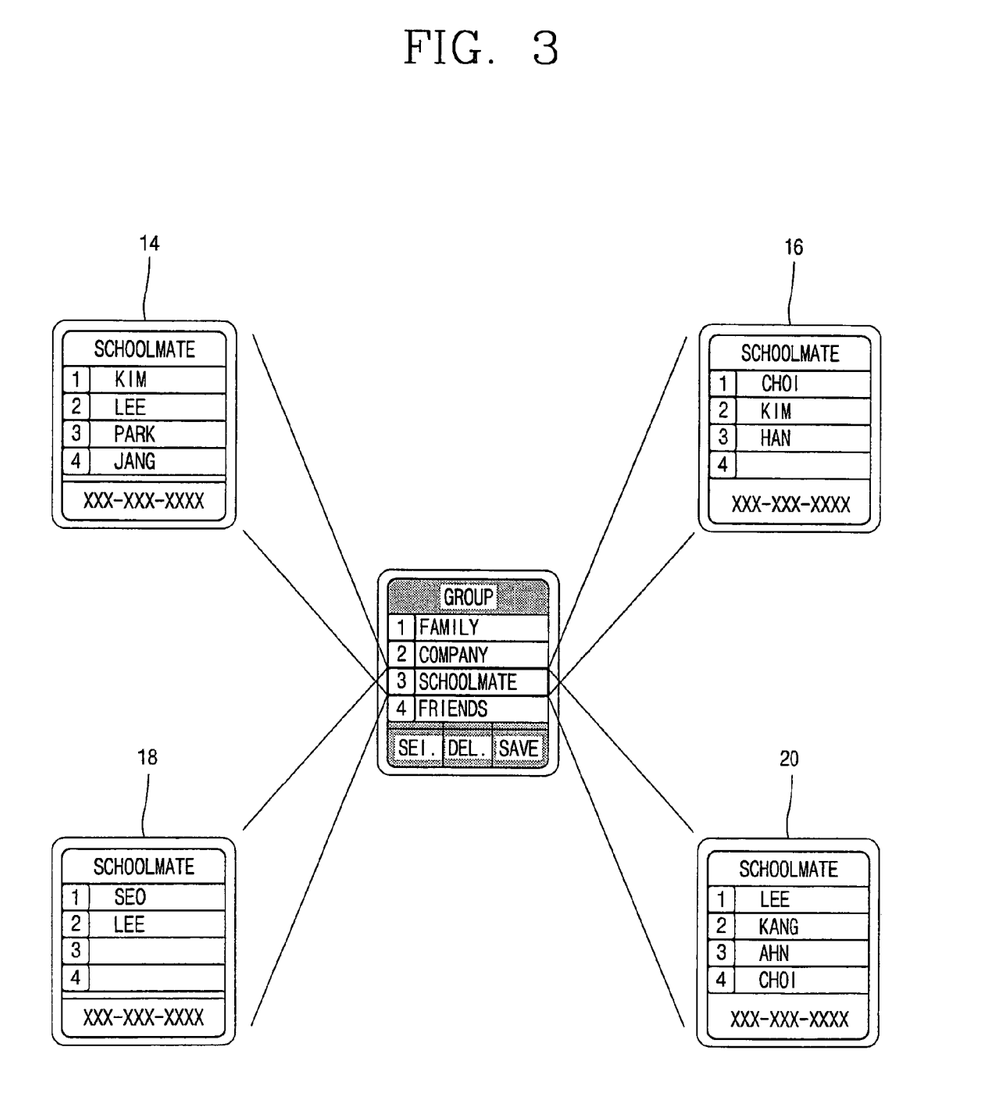
FIG. 3 schematically illustrates one embodiment of the present invention.
Figure 4:
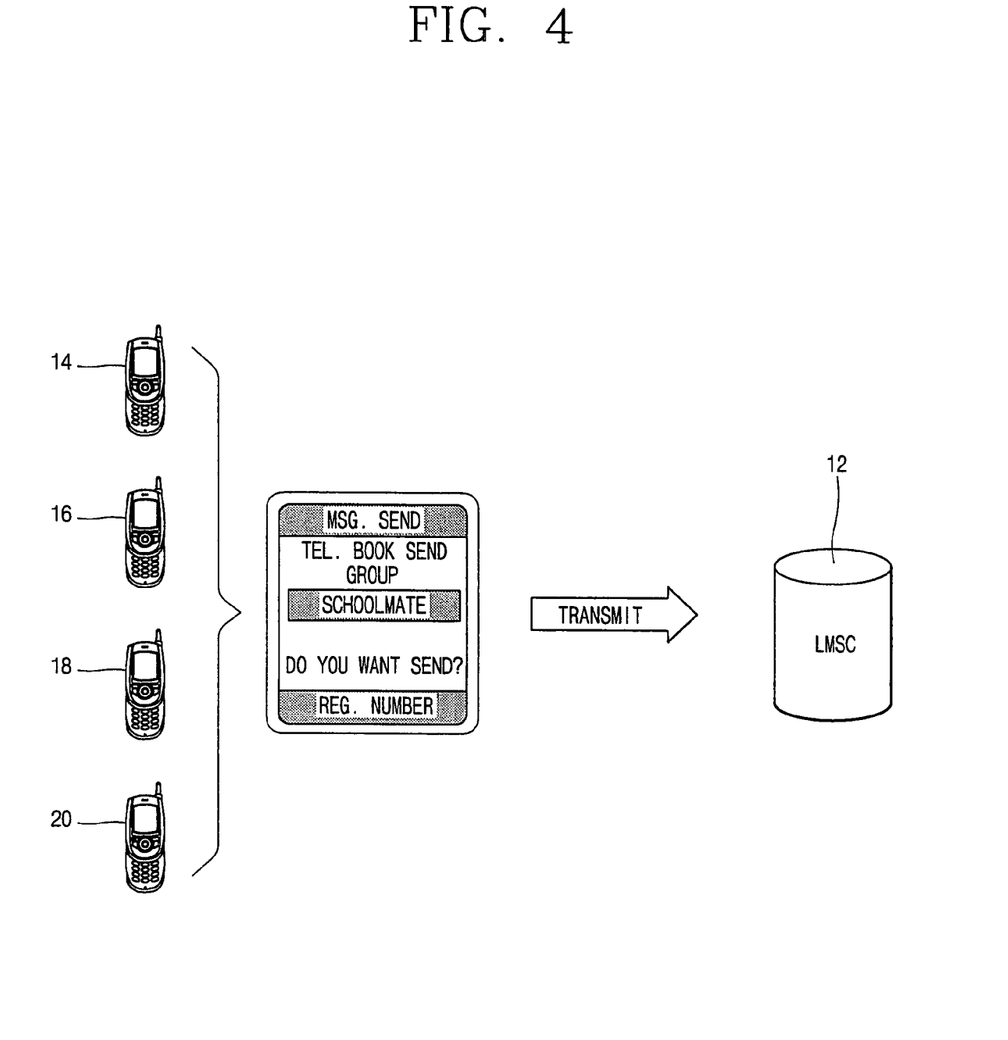
FIG. 4 schematically illustrates another embodiment of the present invention.
Figure 5:
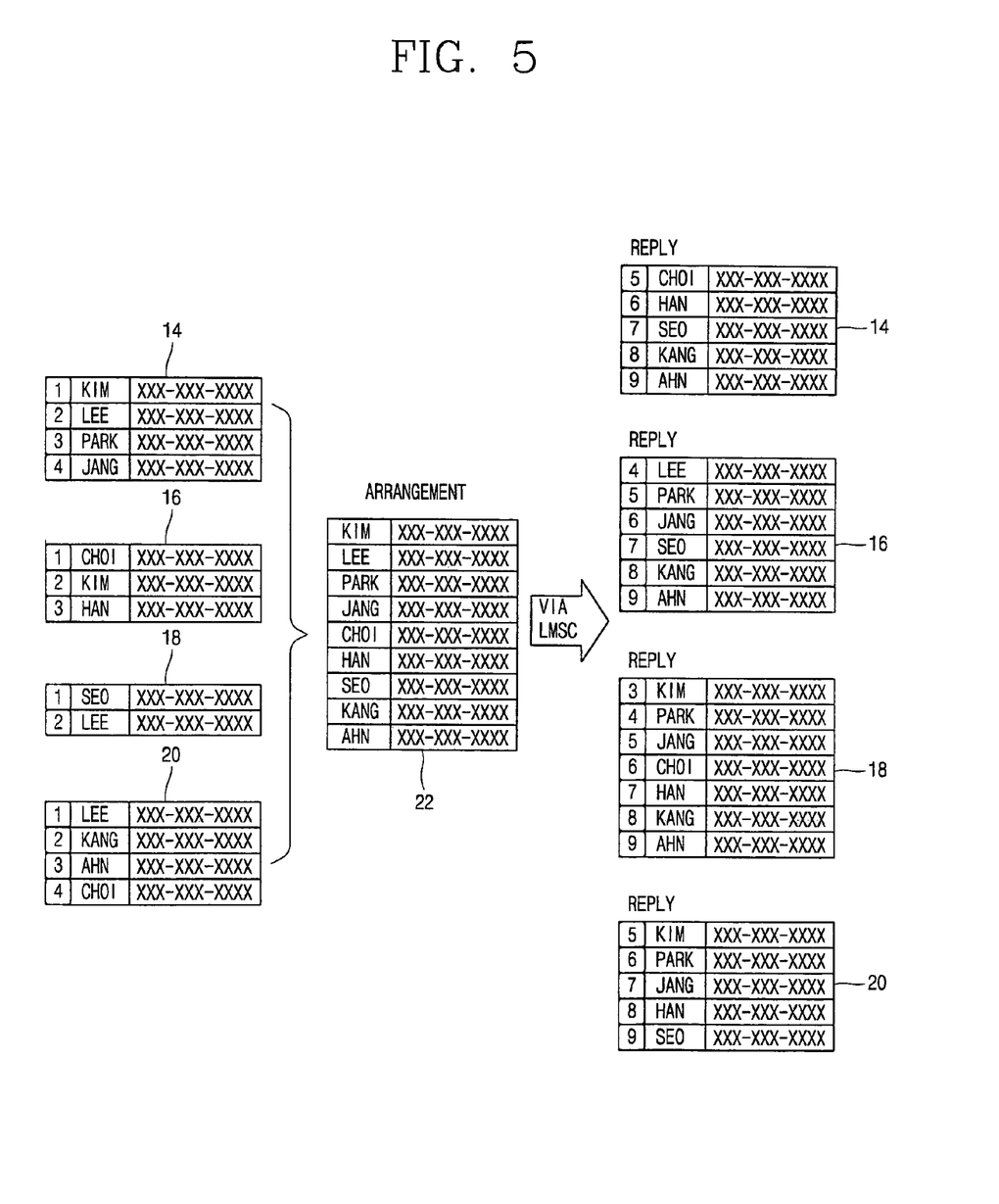
FIG. 5 schematically illustrates yet another embodiment of the present invention.
Figure 6:
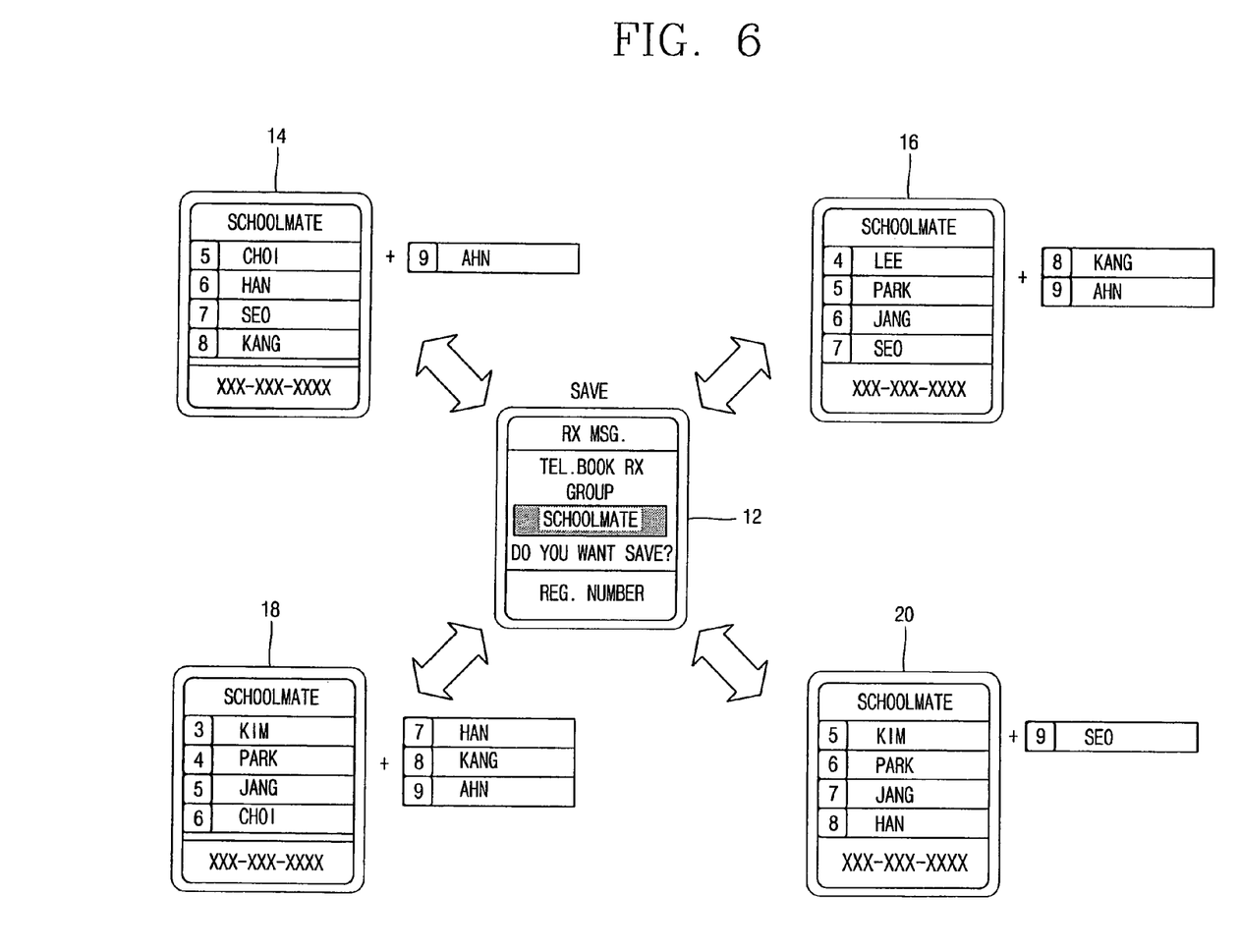
FIG. 6 schematically illustrates still another embodiment of the present invention.

Each mobile terminal includes processor and memory adapted to store a variety of data organized in groups such as, for example, the telephone numbers of fellow members of an alumni group designated as "Schoolmate" in FIG. 3. Other data groups may be stored in memory such as "Family", "Company", Friends", as generally depicted in FIG. 3.

For example, mobile terminal 14 may have previously stored the telephone numbers of fellow alumni members Kim, Lee, Park, and Jang, but currently lacks telephone number information on remaining alumni members Choi, Han, Seo, Kang, and Ahn. Mobile terminal 16, on the other hand, may have previously stored the telephone numbers of fellow alumni members Choi, Kim, and Han, but presently lacks telephone number information on remaining alumni members Lee, Park, Jang, Seo, Kang, and Ahn. Mobile terminal 18 may have previously stored the telephone numbers of fellow alumni members Seo and Lee, but currently lacks telephone number information on remaining alumni members Kim, Park, Jang, Choi, Han, Kang, and Ahn. Mobile terminal 20 may have previously stored the telephone numbers of fellow alumni members Lee, Kang, Ahn, and Choi, but presently lacks telephone number information on remaining alumni members Han, Seo, Kim, Park, and Jang, as generally shown in reference to FIG. 3.

It would be desirable to automatically synchronize the stored alumni telephone number information on each mobile terminal with the stored alumni telephone number information on the remaining mobile terminals while avoiding unnecessary duplication of data. For example, mobile terminal 14 would need to request, receive and store alumni telephone number information on alumni members Choi, Han, Seo, Kang, and Ahn, but not on Kim, Lee, Park or Jang, since telephone number information on Kim, Lee, Park or Jang is already stored in its memory and adding it again would constitute undesirable waste of memory. To this extent, information synchronization system 10 is adapted to provide such functionality using LMS messaging, as generally described herein below.

Figure 2:
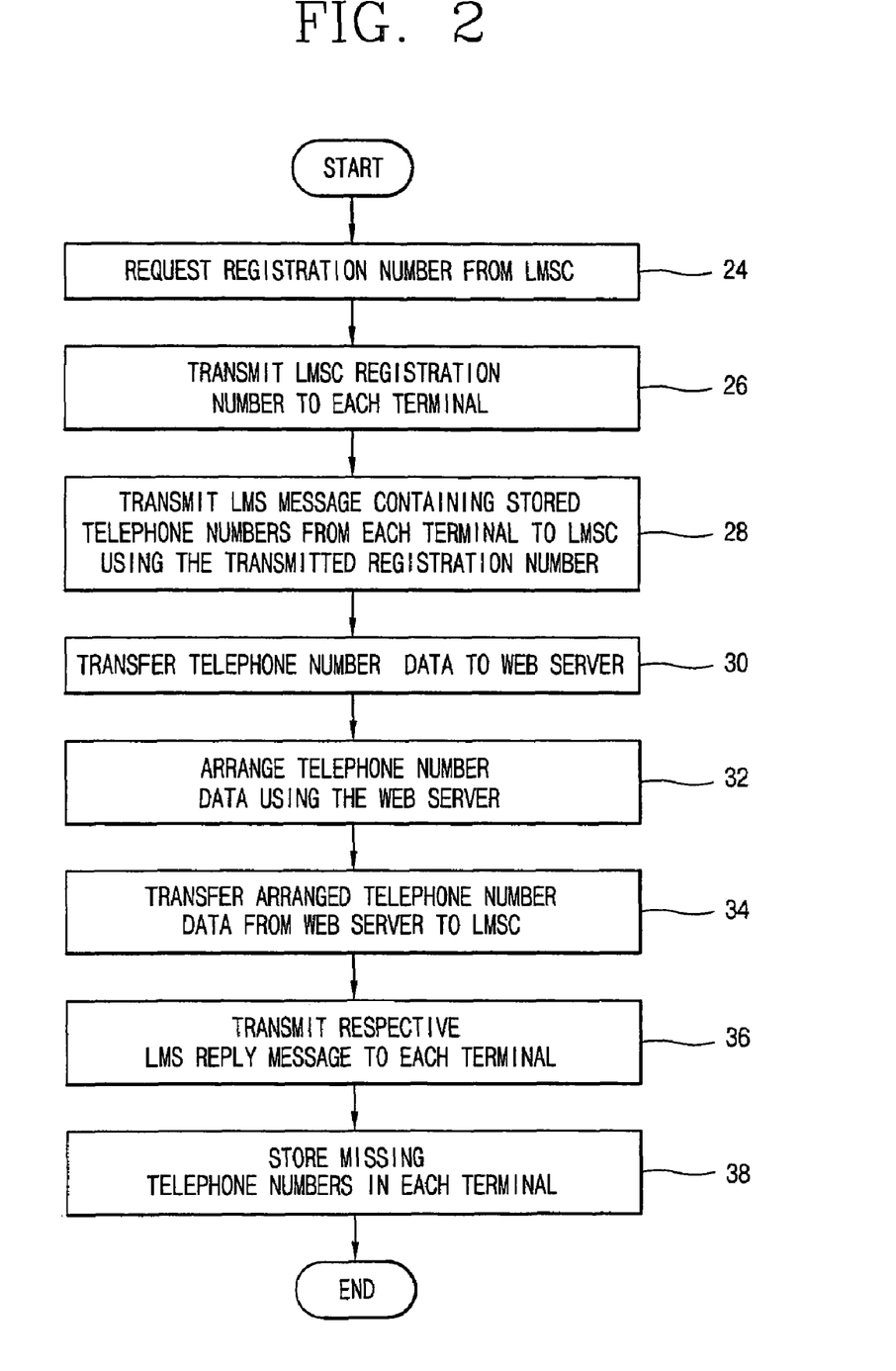
FIG. 2 is a flowchart illustrating a method for synchronizing information on a plurality of mobile terminals without duplication of data in accordance with the present invention.

FIG. 2 is a flowchart generally illustrating a method for synchronizing information on a plurality of mobile terminals without duplication of data, in accordance with another preferred embodiment of the present invention. For example, any one of mobile terminals 14-20 may request a registration number from LMSC 12 to initiate LMS messaging with LMSC 12, step 24, FIG. 2. LMSC 12 transmits a specific registration number to each terminal, step 26, FIG. 2.

Thereafter, each mobile terminal (14-20) transmits a LMS message containing its stored "Schoolmate" telephone number data to LMSC 12 (FIG. 4) using its specific LMSC registration number, step 28, FIG. 2. LMSC 12, in turn, combines the received "Schoolmate" telephone number data and transfers the same as LMS message to web server 22 for processing, step 30, FIG. 2. Web server 22 arranges the combined telephone number data (FIG. 5) so that each mobile terminal would receive only its respective missing telephone number data avoiding unnecessary data duplication, step 32, FIG. 2.

Web server 22 transfers the arranged telephone number data as LMS message back to LMSC 12, step 34, FIG. 2. Thereafter, LMSC 12 transmits a respective LMS reply message to each mobile terminal (14-20), step 36, FIG. 2. As generally depicted in reference to FIG. 6, each LMS reply message contains only missing telephone number data (information) for its respective mobile terminal. Duplication of data is completely avoided. Subsequently, each mobile terminal stores its respective missing telephone numbers in memory, step 38, FIG. 2, achieving telephone number synchronization without data duplication.

A person skilled in the art would readily appreciate that the above-described information synchronization system and method may be utilized for exchange and/or sharing of multimedia information which can be stored not only in mobile terminals but also in personal digital assistants (PDAs), laptops, etc.

All terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

While the present invention has been described in detail with regards to several embodiments, it should be appreciated that various modifications and variations may be made in the present invention without departing from the scope or spirit of the invention. In this regard it is important to note that practicing the invention is not limited to the applications described hereinabove.

Many other applications and/or alterations may be utilized provided that such other applications and/or alterations do not deviate from the intended purpose of the present invention. For example, the shape of the guiding groove may be varied, as needed. Furthermore, the number of ratchet indentations as well as the configuration of each indentation may be varied. Also, features illustrated or described as part of one embodiment can be used in another embodiment to provide yet another embodiment such that the features are not limited to the embodiments described above. Thus, it is intended that the present invention cover all such embodiments and variations as long as such embodiments and variations come within the scope of the appended claims and their equivalents.

What is claimed is:

1. An information synchronization system, comprising:
   a plurality of mobile terminals, each of the mobile terminals adapted to store telephone number data organized in a group and to transmit the group to a mobile service interface, wherein the group in at least one of the mobile terminals is missing telephone number data that is in the group of at least one of the other mobile terminals;
   at least one mobile service interface adapted to receive the telephone number data groups from each of the mobile terminals, to combine the telephone number data and to transmit the combined telephone number data for processing; and
   at least one processor adapted to receive the combined telephone number data, to arrange the combined telephone number data for each of the mobile terminals to include only the telephone number data that is missing from the group for each of the respective mobile terminals, and to transmit the arranged telephone number data to each of the mobile terminals by way of said at least one mobile service interface,
   wherein, each of the mobile terminals is adapted to store the arranged telephone number data in the group,
   when the arranged telephone number data is stored in the group of each of the mobile terminals, the group in all of the mobile terminals is synchronized without duplication of telephone number data in the group in any of the mobile terminals,
   each of said plurality of mobile terminals and said at least one processor are capable of long message service (LMS) messaging with said at least one mobile service interface, and
   said at least one mobile service interface is a long message service center (LMSC).

2. The information synchronization system of claim 1, wherein said at least one processor is a web server.

3. A method for synchronizing information, comprising:
   providing a plurality of mobile terminals, each of the mobile terminals adapted to store telephone number data organized in a group, wherein the group in at least one of the mobile terminals is missing telephone number data that is in the group of at least one of the other mobile terminals;
   providing at least one mobile service interface;

transmitting the telephone number data group from each of the mobile terminals to the at least one mobile service interface;

combining the telephone number data in the at least one mobile service interface;

providing at least one processor;

transmitting the combined telephone number data from the at least one mobile service interface to the at least one processor;

arranging the combined telephone number data for each of the mobile terminals using the at least one processor to include only the telephone number data that is missing from the group for each of the respective mobile terminals;

transmitting the arranged telephone number data for each of the mobile terminals from the at least one processor to the at least one mobile service interface;

transmitting the respective arranged telephone number data from the at least one mobile service interface to each of the mobile terminals; and storing the respective arranged telephone number data in each of the mobile terminals, wherein, when the arranged telephone number data is stored in each of the mobile terminals, the telephone number data group is synchronized between all of the mobile terminals without duplication of telephone number data in the group in any of the mobile terminals, each of said plurality of mobile terminals and said at least one processor are capable of long message service (LMS) messaging with said at least one mobile service interface, and said at least one mobile service interface is a long message service center (LMSC).

4. The information synchronization method of claim 3, wherein said at least one processor is a web server.

\* \* \* \* \*